United States Patent [19]
Honer

[11] 3,966,497
[45] June 29, 1976

[54] SEAWATER BATTERY

[75] Inventor: Harold Nickolas Honer, Raleigh, N.C.

[73] Assignee: ESB Incorporated, Philadelphia, Pa.

[22] Filed: Sept. 16, 1974

[21] Appl. No.: 506,304

[52] U.S. Cl. .............................. 136/90; 136/110; 136/112
[51] Int. Cl.² ..................................... H01M 6/34
[58] Field of Search ............... 136/90, 91, 92, 110, 136/112, 114, 10, 100 R

[56] References Cited
UNITED STATES PATENTS

| | | | |
|---|---|---|---|
| 2,699,461 | 1/1955 | Wilke | 136/112 |
| 2,715,652 | 8/1955 | Chubb et al. | 136/112 |
| 3,003,013 | 10/1961 | Duddy | 136/90 |
| 3,261,718 | 7/1966 | Wilke | 136/90 |
| 3,451,855 | 6/1969 | Jones et al. | 136/90 |
| 3,462,309 | 8/1969 | Wilson | 136/90 |
| 3,496,025 | 2/1970 | Abe et al. | 136/90 |
| 3,542,599 | 11/1970 | Fiandt | 136/90 |
| 3,725,133 | 4/1973 | Pollack et al. | 136/90 |

*Primary Examiner*—Maynard R. Wilbur
*Assistant Examiner*—G. E. Montone
*Attorney, Agent, or Firm*—Wm. Wharton Smith; Robert H. Robinson; Anthony J. Rossi

[57] ABSTRACT

A seawater battery comprises a plurality of bipolar electrodes. Each bipolar electrode includes an anode and a cathode attached to the alternate sides of a barrier. The barrier is a sheet of thin flexible plastic material. The edges of the barrier extend beyond the edges of the anode and cathode. Opposing edges of the barrier are folded against the opposing edges of the anode so as to form flanges. A suitable number of the bipolar electrodes, along with suitable endwalls and end electrodes, are assembled so that the flanges of any particular bipolar electrode overlap the flanges of an adjacent barrier. An adhesive tape is wrapped around the assembly sealing the several edges of the barriers, including the flanges, and holding the bipolar electrodes in place. Alternately, a hot melt may be used to seal some or all of the battery edges. Because the barriers are very thin, the battery is compact and economical of space. Further, it is economical to construct.

13 Claims, 9 Drawing Figures

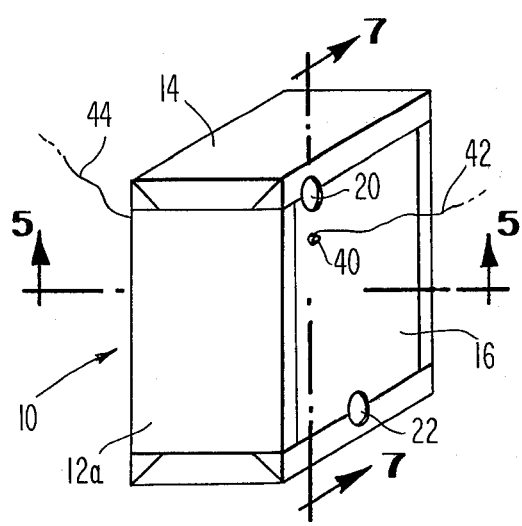
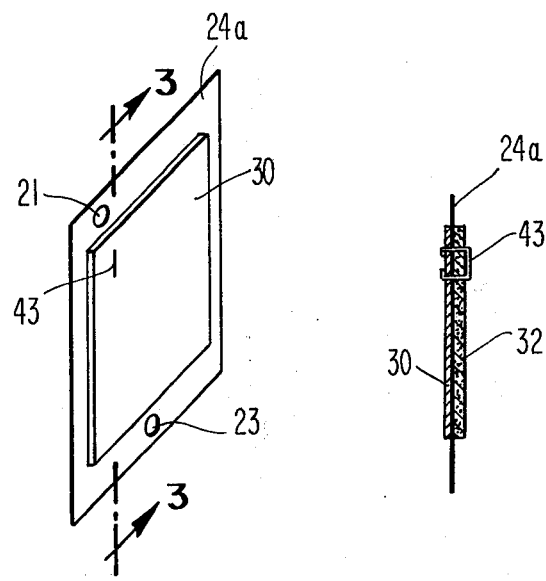
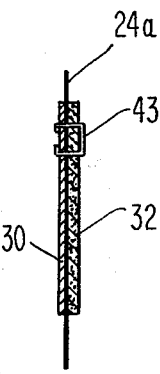
Fig. 1   Fig. 2   Fig. 3
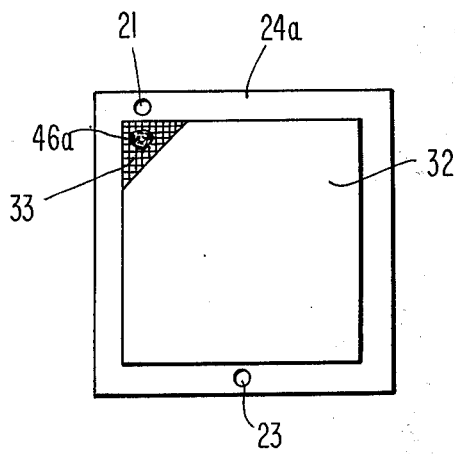
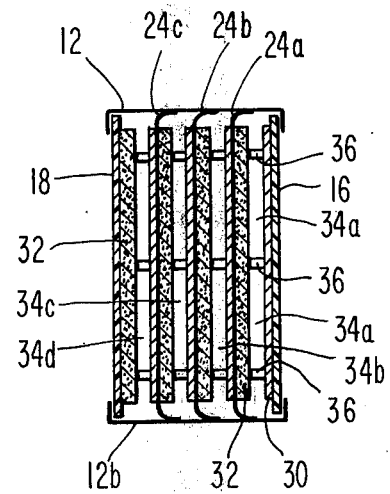
Fig. 4   Fig. 5

3,966,497

SEAWATER BATTERY

BACKGROUND OF THE INVENTION

1. Field of the Invention

This invention relates to reserve type primary galvanic batteries. In particular, it relates to reserve batteries which operate by immersion in seawater.

2. Description of the Prior Art

There is a class of batteries employing zinc, aluminum or magnesium anodes and silver chloride, copper chloride or lead chloride cathodes which are activated by and operate submerged in a weak aqueous electrolyte such as seawater. Such batteries are completely inactive until immersion. Batteries of this type have been used in considerable quantity in ocean waters. The equipment with which they are associated is often of the non-recoverable sort. Also, the use perod is often limited to a few hours.

It has been a prime objective of designers of such batteries to seek ways to simplify the constructional details of the batteries so as to reduce costs both with respect to the materials used therein and with respect to the labor required to assemble the batteries.

In a number of known devices, bipolar plate subassemblies are used. By this term is meant a subassembly comprising the anode of a first cell, the cathode of a second cell and a barrier impervious to electrolyte located between the two electrodes. A number of such bipolar plates are piled together with terminal anode and cathode at opposite ends and the barriers properly sealed to a container resulting in a multicell battery. In many bipolar subassemblies the barrier is a metal sheet contacting the anode on one side and the cathode on the other. This provides a very low resistance electrical path from anode to cathode of adjacent cells. It provides a strong support for both anode and cathode. However, the choice of metal is somewhat limited since it must be electrochemically compatible with both anode and cathode. It must be free from attack by the electrolyte, it must not passivate by contact with the electrolyte and it must avoid local action effects. Further, a metal barrier will add weight to the battery assembly when compared to a battery having non-metallic barriers. Bipolar plates having electrodes attached to either side of a molded plastic barrier are known. With this design, a lip having a thickness equal to that of the length of a cell may be molded about periphery perifery of the barrier. A battery is built from such bipolar subassemblies simply by cementing the lip of one barrier to that of the next. However, costly dies are required for the molding of such barriers. Also, there is a limit to the thinness to which a molded part can be made. The limit is about 0.5 mm or greater.

Assemblies are known where a series of bipolar subassemblies with barriers extending outwardly therefrom are dipped into a suitable plastic material for a short time. The plastic material bridges the gap from barrier to barrier and, upon setting, forms a shell or battery casing.

SUMMARY OF THE INVENTION

The present invention is a galvanic battery made up of a series of bipolar electrodes. The bipolar electrodes comprise a barrier made of a sheet of flexible plastic material with an anode on one side and a cathode on the other. Intercell connector penetrating anode, barrier and cathode holds the assembly together and serves as an electrical conductor from one cell to the next. Endwalls with suitable electrodes attached thereto are located at either end of the assembly. The opposing edges of the barriers are folded over to form a series of flanges. Sealing means applied to the sides of the assembly contact and seal the flanges and form the sidewalls of the battery. Adhesive tape or alternately a plastic dip may be used to form the topwall and bottom wall of the battery.

A first objective of the invention is to provide a compact and light weight battery assembly. A second objective is to design a battery in which the labor of assembly is minimum.

BRIEF DESCRIPTION OF THE DRAWINGS

FIG. 1 depicts in perspective the battery of the invention;

FIG. 2 depicts in perspective a bipolar assembly of the invention;

FIG. 3 depicts in cross section 3—3 of FIG. 2;

FIG. 4 depicts in elevation a second embodiment of the bipolar assembly;

FIG. 5 depicts cross section 5—5 of FIG. 1;

DESCRIPTION OF THE PREFERRED EMBODIMENT

Figure 7:
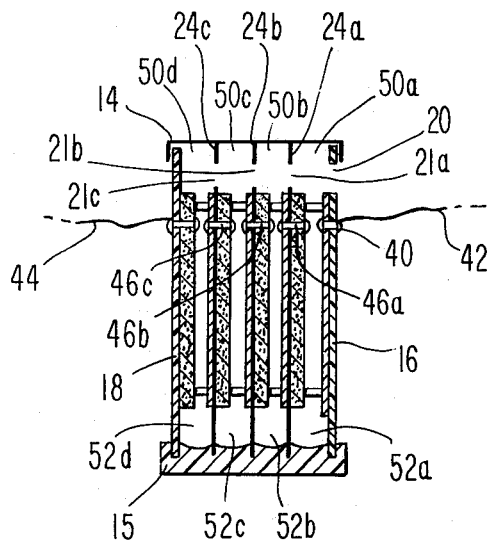
FIG. 7 depicts cross section 7—7 of FIG. 1.

Seawater batteries of the type relating to the present invention are single discharge devices often used in considerable quantity and thus are expected to be as low cost in design as is consistent with reliability in all its aspects. The battery of this invention is of such a nature, although the concept of the present invention is not limited solely to the present detailed description. The batteries are usually prismatic in shape with rectangular plates and barriers, the plane of the plates and barriers being vertical.

In FIG. 1, 10 represents in perspective a completed battery embodying the invention. A sidewall 12a, a top 14 and an endwall 16 are shown. A second sidewall 12b, bottom 15 and second endwall 18 (see FIGS. 4 and 5) complete the external features of the battery. In one form and that of FIG. 1, the endwalls are made of stiff plastic sheet and the sidewalls, the top and bottom are one or more ribbons of adhesively coated insulating tape wrapped around the endwalls and thus containing the battery. In endwall 16, a top port 20 is shown near top 14 and sidewall 12a. A second pot 22 is also shown near the bottom of the battery. Ports 22 and 20 provide for the ingress and egress respectively of electrolyte, e.g., seawater, to the electrochemically active materials of the battery.

FIGS. 2 and 3 illustrate a typical bipolar electrode subassembly of the invention. In the figures, 24a represents a barrier made of a sheet of flexible plastic non-conductive material. For seawater electrolyte batteries, any waterproof dielectric sheet material may be used for the barriers such as polyethylene, polypropylene, polystyrene, etc. However, polyethylene terephthalate has been found to have better handling properties compared to other materials tested. In order to save space in the battery, or in other words to make the battery as small as possible, the barriers should be thin. However, they must be stiff enough to be self-supporting and this puts a limit on the thinness of the barrier. It has been found that polyethylene terephthalate has the property of being stiff and otherwise more suitable than other available plastic sheet materials in the thickness range of 0.05 to 0.25 mm.

30 represents an anode located next to one face of the barrier and 32 presents a cathode next to the opposite or second face of the barrier.

Normally the anodes or negative electrodes of seawater type batteries are metallic and are chosen from magnesium, zinc and aluminum, the active material of the cathodes or positive electrodes are sheets of chemically active material including the halides of metals such as lead chloride, silver chloride, copper chloride, etc., with a conductive metal screen or other conductive grid embedded therein. A fastening device 43, in this case a staple, penetrates the anode, the barrier and the cathode. It serves both to provide an intercell electrical connection from anode to cathode and to fasten both electrodes to the barrier, thus forming the bipolar assembly.

Other forms of intercell connections passing through anode, barrier and cathode include rivets and metallic clips. These also provide the double function noted above. Alternately, a metallic or conductive plastic ribbon may be folded over an edge of the barrier to which the electrodes are contacted by pressing the battery together at the time of final assembly. These do not provide the support of the mechanical connector.

It should be noted that in other forms of bipolar electrodes where a metallic barrier is used, the electrical conductivity of the connector between anode and cathode will be many times greater than that of the fastening devices used in the present invention. However, since the devices to which the invention relates are used only at comparatively low rates of discharge, the fastening devices as discussed have proven to be satisfactory. Ports for transmission of electrolyte, such as those shown at 21 and 23, complete the bipolar subassembly.

It has been found that when batteries employing fasteners such as rivets or staples for intercell connectors passing through anode, barrier and cathode are discharged, particularly for long duration discharges, the cathode materials are electrochemically reduced and occupy less volume. This reduces the tightness of the contact and may cause a reduction in the battery performance. Therefore, it has been found advantageous in batteries built for long duration discharges (say 8 hours or more) to have a portion of the cathode grid structure free of the cathode active material, and to make the electrical contact to the bare grid. This assembly is shown in FIG. 4 in which a bare corner 33 of the cathode 32 is shown having a rivet 46a passing therethrough.

FIG. 5 is a horizontal cross section of the battery of FIG. 1 along the line 5—5. This battery comprises four cells. However, the invention has been used to advantage in batteries having up to 16 cells. The interior of the battery is divided into four cell compartments by the barriers 24a, 24b and 24c each barrier being located between each adjacent pair of cells of the battery, and each with its electrodes attached being a bipolar electrode subassembly. It is to be noted that endwall 16 supports an anode 30 on its inner face and that endwall 18 similarly supports a cathode 32 thus completing the first and fourth cell of the battery. Electrolyte spaces 34a, 34b, 34c and 34d are provided between the anode and cathode of each cell.

The electrolyte space 34 is preserved by plate spacing means. In the design of FIG. 5, the means comprises a series of plastic buttons 36 adhered to the face of one of the electrodes, preferably the anode. Alternatively, sheeted materials such as non woven fabrics may be used for plate separation. In FIG. 7, a connector 40, in this instance a rivet, electrically connected to the anode adjacent to endwall 16 passes through endwall 16 and is in turn connected to terminal wire 42, a similar arrangement provides a connection from the cathode attached to endwall 18 to terminal wire 44.

In seawater batteries of the type relating to the present invention, there is a natural circulation of electrolyte from bottom to top of each cell. The circulation is due to a combination of temperature differentials, gas bubble formation and increase of density due to formation of partially soluble end products. The circulation of electrolyte is necessary to wash out the end products and provide fresh electrolyte for the duration of the discharge. This is well known in the art and numerous patents have issued relating to means of porting of cells and batteries. In order to obtain circulation in a battery of the type here discussed, it is necessary that the battery operate in a generally vertical position. This can be identified by being a position in which a first electrolyte port is above the second port. The orientation of the battery as shown in FIG. 1 is the normal operating position as shown by the location of top port 20 and bottom port 22. The sidewalls 12a and 12b (FIG. 5) and endwalls 16 and 18 (FIG. 5) are in vertical planes and the top 14 and bottom 15 (FIG. 7) are in horizontal planes.

Figure 6:
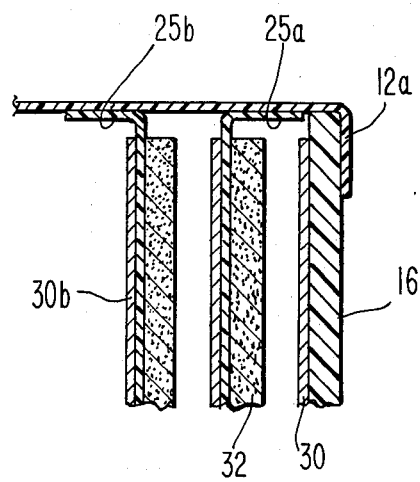
FIG. 6 depicts an area of FIG. 5.

The width of the barriers is somewhat greater than the width of the endwalls. At the time of battery assembly, two opposing edges of each barrier are folded over to form flanges. It is desirable that the flanges do not interfere with the ports such as 21, 23 (FIG. 2) and therefore, in the construction shown, the flanges are formed on the vertical rather than the horizontal edges of the barriers. The flanges 24a to N-1 extending the entire height of the barriers and on each edge thereof. The flanges of one cell approach the flanges of an adjacent cell so that the flanges form an inner part of the vertical end walls of each cell except for one or the other of the end cells. One or more adhesively coated tapes 12a ad 12b for sealing the sidewalls of the battery are wrapped around endwalls 16 and 18 and contact the outer faces of each of the several flanges of the barriers. The faces of the flanges provide an adherance surface for the adhesive tape and serve to locate and hold the several bipolar assemblies with respect to the battery assembly as well as sealing off each cell compartment from the cells adjacent thereto. The flanges 24 and the tape or tapes 12a and 12b alone form the end walls of the individual cells. The tapes 12a and 12b also overlap the endwalls 16 and 18 of the battery and are sealed thereto by the adhesive coating. The actual sidewalls of the completed battery are a composite of flange material 24a to 24 (N-1) and tape 12a and 12b, except for the side walls of the first cell or alternatively the Nth cell depending upon the orientation of the flanges. The side walls of this one cell are formed by the adhesive tape or tapes alone. The construction is shown in FIG. 6, an enlargement of the top corner of FIG. 5. In FIG. 6, 25a represents a flange formed on the vertical edge of barrier 24a, and 25b represents a flange formed on the vertical edge of barrier 24b.

FIG. 7 depicts in section the battery of FIG. 1 along the line 7—7. The anode 30 and cathode 32 are somewhat shorter than the full heights of the battery so as to leave top passages 50a, 50b, 50c and 50d and bottom passages 52a, 52b, 52c and 52d within the structure. The top passage 50a runs from sidewall 12a to sidewall 12b and is defined by the first endwall 16, the first barrier 24a and the top wall 14. Further, it is continuously open to the electrolyte space 34 of the first cell. The bottom passage 52a likewise runs from sidewall 12a to sidewall 12b and is defined by the bottom wall 15, the first endwall 16 and the first barrier 24a. The first bottom passage is continuously open to the electrolyte space 34 of the first cell. The top passages 50b, 50c, 50d and bottom passages 52b, 52c and 52d defined in turn by the barriers and the second endwall are associated with each of the succeeding cells of the battery. The several passages are connected together and to the outside by ports 20 and 21a, 21b and 21c.

Rivets 46a, 46b, and 46c, FIG. 7 serve the same purpose of intercell connector and fastener as the staple 43 of FIG. 3. Alternate constructions are shown in FIG. 7 for the topwall and bottom wall of the battery. In the first construction, as shown at 14, a strip of adhesive tape is placed over the top or bottom of the battery and pressed down to contact the top or bottom edges of the barriers, the sidewalls and the endwalls of the battery. Alternately, as shown at 15, the battery is dipped into a liquid plastic or hot melt material which is then permitted to set so as to form a solidified material. One type of suitable plastic is epoxy resin. A typical holt melt may be a mixture of waxes, natural rosins, etc., as well known in the art. The second of these constructions is more rugged than the first.

In the manufacture of the cathodes described above, it is found that the support grid may be embedded into a sheet of the chosen cathode mix in such a manner that the grid is exposed on one surface of the cathode and distant from the opposite face. When such a cathode is used in a battery of the construction noted above, it has been found that the position of the grid with respect to the electrolyte and the barrier flanges is an important factor in achieving rapid activation. It has been found that the battery will activate more rapidly upon immersion if the face of the cathode having the grid exposed on its surface is in direct contact with the electrolyte and away from the barrier.

The flanges of the barriers may be folded either toward the anode side of the barrier or the cathode side. Where the cathode is thick and rugged, there is little choice as to the direction of the fold. However, when the cathode is thin and fragile, it is desirable to fold the flange toward the anode. By this practice, there is less chance of breaking the edges of the cathode which might result in poor performance and possible short circuitry of one or more cells.

In FIG. 6, flange 25a is shown folded toward the cathode 32. Flange 25b is shown folded toward anode 30b.

Seawater batteries as built using the constructions noted above have been completely successful in test and in actual service discharges. Of particular interest, has been the ability of the battery to successfully withstand extreme environmental exposure including shock and vibration testing.

Figure 8:
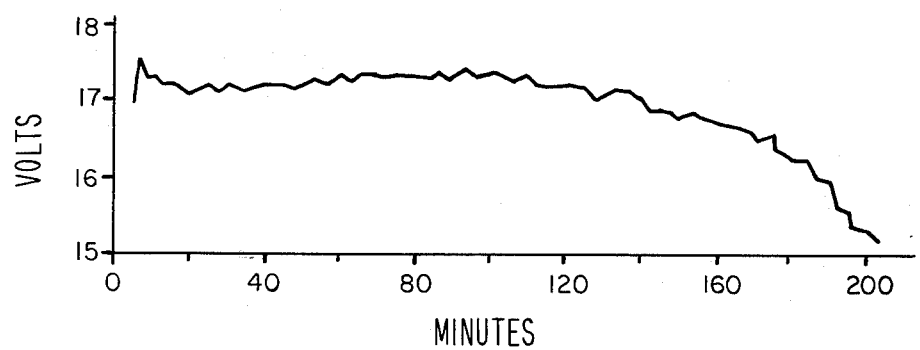
FIG. 8 depicts the discharge voltage of a lead chloride-magnesium battery embodying the invention.

FIG. 8 shows the voltage during discharge of a 16 cell lead chloride magnesium battery made in accordance with the present invention. From the 3 minute point to the end of the discharge the battery was immersed in a 3% saline solution at 30°C. and the load resistance was 87 ohms.

Figure 9:
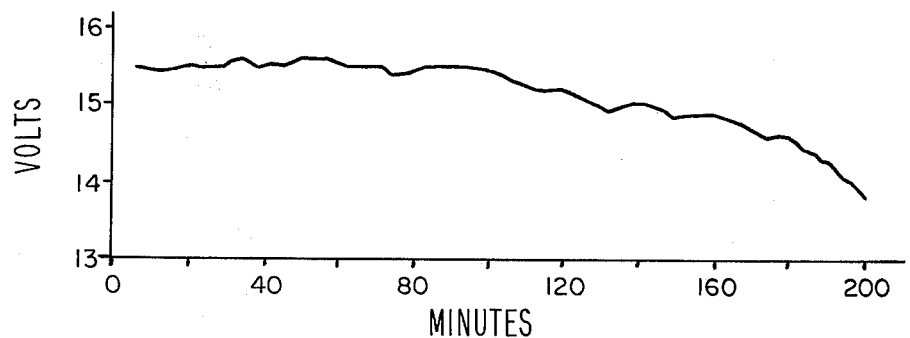
FIG. 9 depicts the discharge voltage of a silver chloride-magnesium battery embodying the invention.

FIG. 9 shows similar information resulting from the discharge of a 13 cell silver chloride magnesium battery under similar conditions.

Having fully described my invention and shown how it is applied, I now claim:

1. A galvanic battery including sidewalls, the battery comprising a plurality of bipolar electrodes each bipolar electrode comprising:
  a. a barrier made of a sheet of thin flexible non-conductive material, the barrier having a first side and a second side and two opposed edges, the barrier being bent in the vicinity of each opposed edge to form a flange;
  b. a cathode located adjacent the first side of the barrier;
  c. an anode located adjacent the second side of the barrier;
  d. a means for electrically connecting the cathode to the anode; the battery further identified in that;
  e. the several bipolar electrodes are parallel one to another;
  f. that the flanges of at least one cell approach the flanges of at least one adjacent cell; and
  g. the battery also includes at least one adhesively coated tape for sealing the sides of the battery, the tape being adhered to the flanges of the barriers, the tape and the flanges alone forming the sidewall of the battery and the edgewalls of at least one cell.

2. A galvanic battery as defined in claim 1 wherein the material of each non-conductive barrier forming the plurality of electrodes is a flexible material and the thickness thereof is within the range of 0.05 to 0.2 mm.

3. A galvanic battery as defined in claim 1 wherein the cathode comprises a sheet of depolarizer mix and a conductive grid embedded therein, the grid being located adjacent one face of the sheet of depolarizer mix, the face of the sheet of depolarizer mix having the grid non adjacent thereto being adjacent to the non-conductive barrier.

4. A galvanic battery as defined in claim 1 wherein the flange on each opposed edge of each barrier faces in the direction of the anode attached to the face of said barrier.

5. A galvanic battery comprising a plurality of cells, each cell including a cathode and an anode, the battery being characterized by a first endwall and a second endwall, each endwall having a first and a second opposed edge, a top and a bottom, a plurality of barriers, one barrier separating each adjacent pair of cells, the barriers being composed of a flexible electrically non-conductive material, each barrier having a first face and a second face, a first edge and a second edge, a top and a bottom, the first edge and the second edge of each barrier including a first flange and a second flange extending from a face of the barrier; a cathode on the first face of each barrier and an anode on the second face thereof;

individual means for electrically connecting the cathode on the first face of each barrier with the anode on the second face thereof, each means for connecting, penetrating through the respective cathode, barrier and anode, each means for connecting further providing a means for attaching its respective cathode and anode to the barrier, therebetween, an adhesively coated tape, the tape overlapping the endwalls of the battery and being adhered thereto, the tape further being adhered to the flanges of at least one side of the battery, the adhesively coated tape and the flanges alone forming at least one sidewall of the battery.

6. A galvanic battery as defined in claim 5 wherein the first sidewall and the second sidewall are flexible materials having a coating of adhesive material thereon, the coating of adhesive providing the means for sealing the first and second sidewalls to the endwalls and the barriers.

7. A galvanic battery as defined in claim 5 including a topwall, the topwall being a flexible material having a coating of adhesive thereon, the coating of adhesive sealing the topwall to the top of the endwalls, the top of the sidewalls, and the tops of the barriers.

8. A galvanic battery as defined in claim 5 including a bottom wall, the bottom wall being a flexible material having a coating of adhesive thereon, the coating of adhesive sealing the bottom wall to the bottom of the endwalls, the bottom of the sidewalls and the bottom of the barriers.

9. A galvanic battery as defined in claim 5 including a topwall, the topwall comprising a solidified mix, the solidified mix being attached to the tops of the endwalls, the tops of the sidewalls and the tops of the barriers and bridging the spaces between endwalls, barriers and sidewalls.

10. A galvanic battery as defined in claim 5 including a bottom wall, the bottom wall comprising a solidified mix, the solidified mix being attached to the bottoms of the endwalls, the bottoms of the sidewalls and the bottoms of the barriers and bridging the spaces between endwalls, barriers and sidewalls.

11. A galvanic battery as defined in claim 5 including an anode attached to the inner face of the first endwall and a cathode attached to the inner face of the second endwall.

12. A galvanic battery as defined in claim 5 wherein the material of the several anodes is principally magnesium and the material of the several cathodes is principally lead chloride.

13. A galvanic battery as defined in claim 5 wherein the material of the barriers is polyethylene terephthalate.

* * * * *